United States Patent
Eberlein

(10) Patent No.: US 8,985,597 B2
(45) Date of Patent: Mar. 24, 2015

(54) ASSEMBLY FORMED OF AT LEAST TWO WALL ELEMENTS

(76) Inventor: Martin Eberlein, Kammeltal (DE)

(*) Notice: Subject to any disclaimer, the term of this patent is extended or adjusted under 35 U.S.C. 154(b) by 0 days.

(21) Appl. No.: 13/821,051

(22) PCT Filed: Sep. 9, 2011

(86) PCT No.: PCT/DE2011/001717
§ 371 (c)(1),
(2), (4) Date: Mar. 6, 2013

(87) PCT Pub. No.: WO2012/034556
PCT Pub. Date: Mar. 22, 2012

(65) Prior Publication Data

US 2013/0168932 A1    Jul. 4, 2013

(30) Foreign Application Priority Data

Sep. 15, 2010 (DE) .......................... 10 2010 045 455
Sep. 21, 2010 (DE) ..................... 20 2010 012 802 U
Nov. 1, 2010  (DE) .......................... 10 2010 049 882

(51) Int. Cl.
*B62B 5/08*   (2006.01)
*B21F 27/12*  (2006.01)
*B62B 3/14*   (2006.01)

(52) U.S. Cl.
CPC ................ *B62B 5/082* (2013.01); *B21F 27/12* (2013.01); *B62B 3/144* (2013.01); *B62B 2501/067* (2013.01)
USPC .................................................... 280/33.993

(58) Field of Classification Search
USPC ................. 280/33.991, 33.993, 47.34, 47.35, 280/47.38
See application file for complete search history.

(56) References Cited

U.S. PATENT DOCUMENTS 2,889,151 A * 6/1959 Sides ....................... 280/33.993

(Continued)

FOREIGN PATENT DOCUMENTS

FR     1 372 459 A    9/1964

OTHER PUBLICATIONS

International Search Report (in German with English translation) for PCT/DE2011/001717, mailed Apr. 12, 2012; ISA/EP.

*Primary Examiner* — J. Allen Shriver, II
*Assistant Examiner* — Bridget Avery
(74) *Attorney, Agent, or Firm* — Harness, Dickey & Pierce, P.L.C.

(57) ABSTRACT

The invention relates to an assembly (1) formed of at least two wall elements (2, 6), in which the wall elements (2, 6) comprise vertically and horizontally arranged reinforcing elements (10, 11) and the wall elements (2, 6) are either movably connected to one another or are present separately and can be transposed into a space-saving arrangement within a common region (14), wherein, in this arrangement, and according to a first embodiment, either the vertical reinforcing elements (10) of the wall element (6) are located in at least one interspace (12) which is formed by vertical reinforcing elements (10) of the wall element (2), or wherein, according to a second embodiment, the horizontal reinforcing elements (11) of the wall element (6) are located in at least one interspace (13) which is formed by horizontal reinforcing elements (11) of the wall element (2). The invention is distinguished in that, in the space-saving arrangement and within the common region (14) according to the first embodiment, the horizontally extending reinforcing elements (11) of the at least one wall element (6) are at the same time also completely or partially located in interspaces (13) which are formed on the wall element (2) by horizontal reinforcing elements (11), or in that, according to the second embodiment, the vertically arranged reinforcing elements (10) of the at least one wall element (6) are at the same time also completely or partially located in interspaces (12) which are formed on the wall element (2) by vertical reinforcing elements (10), and in that, in both embodiments, the interspaces (12, 13), when viewed across the thickness thereof, are arranged with an offset.

8 Claims, 6 Drawing Sheets

(56) References Cited

U.S. PATENT DOCUMENTS

| | | | | |
|---|---|---|---|---|
| 2,890,057 | A | * | 6/1959 | Davis ........................ 280/33.993 |
| 2,998,978 | A | * | 9/1961 | Sides ........................ 280/33.993 |
| 3,157,410 | A | * | 11/1964 | Hummer ................... 280/33.993 |
| 3,191,956 | A | * | 6/1965 | Rizzuto ......................... 280/641 |
| 3,306,661 | A | * | 2/1967 | Allen ............................ 297/474 |
| 3,375,018 | A | * | 3/1968 | Close ....................... 280/33.991 |
| 3,497,234 | A | * | 2/1970 | Schray ..................... 280/33.993 |
| 3,963,255 | A | | 6/1976 | Trubiano |
| RE32,453 | E | | 7/1987 | Stover et al. |
| 6,203,035 | B1 | | 3/2001 | Ondrasik |
| 7,287,764 | B2 | * | 10/2007 | Russell et al. ............. 280/47.23 |
| 2002/0171214 | A1 | * | 11/2002 | Prather ..................... 280/47.35 |
| 2005/0151333 | A1 | * | 7/2005 | Russell et al. ........... 280/33.993 |
| 2011/0062675 | A1 | * | 3/2011 | Brown et al. ............. 280/33.993 |
| 2011/0304111 | A1 | * | 12/2011 | Russell et al. ........... 280/33.993 |

\* cited by examiner

Fig. 2
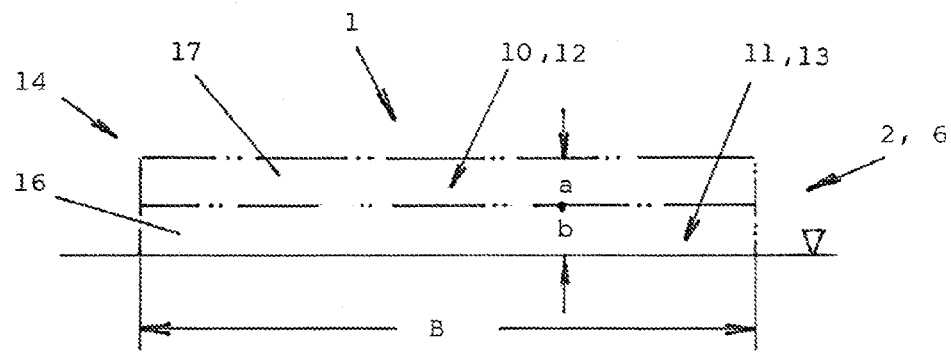
Fig. 3
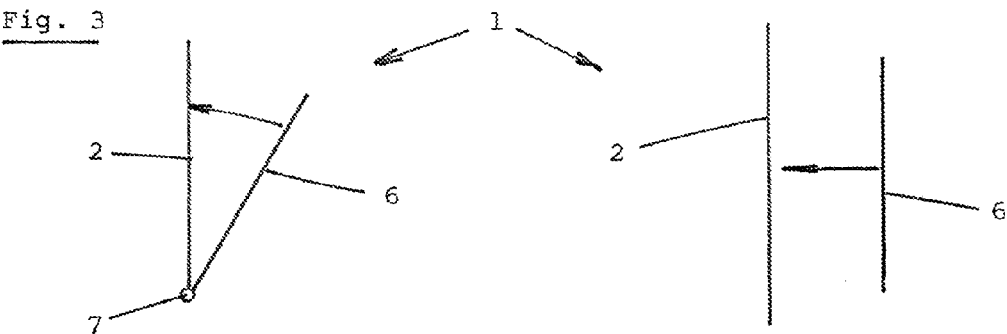
a)                                          b)
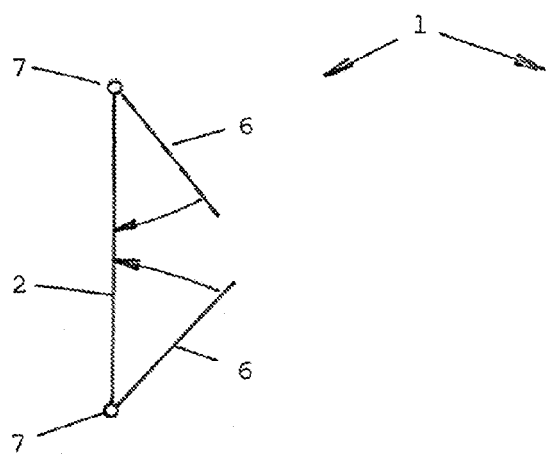 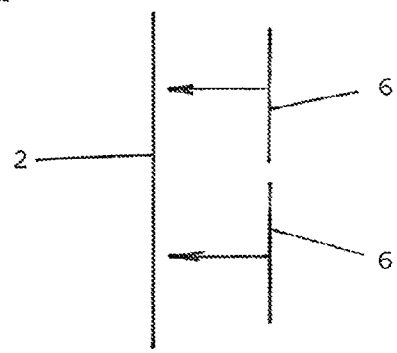
c)                                          d)

ASSEMBLY FORMED OF AT LEAST TWO WALL ELEMENTS

CROSS-REFERENCE TO RELATED APPLICATIONS

This application is a 371 U.S. National Stage of International Application No. PCT/DE2011/001717, filed Sep. 9, 2011, and claims priority to German Patent Application No. 10 2010 045 455.9, filed on Sep. 15, 2010, German Patent Application 20 2010 012 802.1, filed on Sep. 21, 2010, and German Patent Application No. 10 201 0 049 882.3, filed on Nov. 1, 2010, the disclosures of which are herein incorporated by reference in their entirety.

The invention relates to an assembly formed from at least two wall elements, in which assembly the wall elements have vertically and horizontally arranged reinforcement elements and the wall elements are either movably connected to one another or are separate and can be moved into a space-saving arrangement within a common region, wherein, in said arrangement, and in a first embodiment, either the vertical reinforcement elements of the wall element which has been moved into the space-saving arrangement are situated in at least one intermediate space formed by vertical reinforcement elements of the other wall element, or wherein, in a second embodiment, the horizontal reinforcement elements of the wall element which has been moved into the space-saving arrangement are situated in at least one intermediate space formed by horizontal reinforcement elements of the likewise other wall element.

The invention also relates to an assembly, formed from two wall elements, in the form of a child seat flap.

Assemblies are known whose wall elements are formed as wire grid structures. In said type of structures, the reinforcement elements which are formed from wire pieces and which are welded to one another crisscross one another such that for example the vertical reinforcement elements lie on the horizontal reinforcement elements or vice versa. If two wall elements are placed into a space-saving arrangement, it is for example the case that the horizontal reinforcement elements of that wall element which is moved toward the other wall element and which is placed into the space-saving arrangement are situated in at least one intermediate space formed by the horizontal reinforcement elements of the other wall element, while the vertical reinforcement elements of the two wall elements in each case individually occupy a further separate space region, that is to say lie outside the intermediate space mentioned above. This means that the reinforcement elements of the two wall elements are, in a space-saving arrangement, situated in three different space regions which form a pack of a certain thickness. The same applies analogously if the at least one intermediate space is formed by vertical reinforcement elements and is designed for receiving vertical reinforcement elements of the other wall element.

Typical examples of such assemblies are also known in the form of so-called "child seat flaps" which are used in shopping carts that can be pushed one inside the other, that is to say which can be stacked. Said flaps serve firstly to allow a small child to be carried along in the shopping cart without taking up space in the basket, and are secondly necessary in order to close off the rear opening of the basket and to permit space-saving stacking of shopping carts which are not in use, wherein then, the child seat flap of a shopping cart respectively in front is raised by the basket tip of a cart to be pushed in. In the case of the majority of child seat flaps, the rear wall, as a relatively large wall element, and the backrest, as a relatively small wall element, are manufactured from wire, and the seat is manufactured as a plastics part. There are however also child seat flaps composed entirely of plastic, or child seat flaps composed of plastic and wire, wherein wire bars, areal parts, reinforcement ribs or reinforcement webs composed of plastic form the reinforcement elements that permit production of the child seat flaps.

In the case of child seat flaps whose rear wall, as a relatively large wall element, and whose backrest, as a relatively small wall element, are composed of wire bars, the wire bars are welded to one another in a crisscrossed manner. Relatively thick and relatively thin wire bars, whether crisscrossing or not, alternate, and the arrangement of said bars likewise yields three space regions. The vertical wires of the rear wall are situated in the first space region. The horizontal wires of the rear wall and the backrest are located in the second space region, whereas the vertical wires of the backrest are situated in the third space region. This has the effect that, in the common region in which the abovementioned wires form a common pack in the folded-together state of the child seat flap, the thickness of the pack thus formed is considerable. An even thicker pack is obtained in the case of child seat flaps formed from plastic, because significantly greater reinforcement elements in the form of ribs and webs are required. The thickness of the above-described packs has a considerable influence on the stacking intervals between individual shopping carts when these are pushed into one another to form a stack. The thicker the pack, the fewer shopping carts can be parked as a stack in a predetermined area. This leads to a significant increase in shipping costs when shipping such carts.

It is an object of the invention, both in the case of an assembly of the type mentioned in the introduction and also in the case of an assembly in the form of a child seat flap, to position the reinforcement elements of the wall elements such that, in a space-saving arrangement of the wall elements, the thickness of the above-described pack can be reduced.

The solutions found are described in claims 1 and 2.

The advantage of the first solution found consists in that, in the space-saving arrangement of the two wall elements, the horizontal and vertical reinforcement elements thereof are situated only in two different types of intermediate spaces, and thus only in two space regions. As a result, the thickness of the pack formed by the wall elements is smaller, at least in the common region of said wall elements, than in similar assemblies from the prior art.

With regard to the assembly in the form of a child seat flap, the advantage of the invention likewise consists in the logical mutual utilization of the described intermediate spaces, such that a build-up of the reinforcement elements, such as still occurs in the prior art, is avoided. Both the reinforcement elements and the seat, and also the bearing arrangement or the two bearings for the backrest, can thereby be accommodated in precisely two space regions, which, in an extremely expedient manner, leads to a considerable reduction of the thickness of the folded child seat flap. It is thereby advantageously possible for all shopping carts which are equipped with the proposed child seat flap to be parked much closer together, and thus in a much more space-saving manner, in rows, which leads to considerable savings in shipping costs during the shipping of the carts.

The invention will be explained in more detail on the basis of exemplary embodiments. In the figures:

FIG. 2 shows two space regions;

Figure 4:
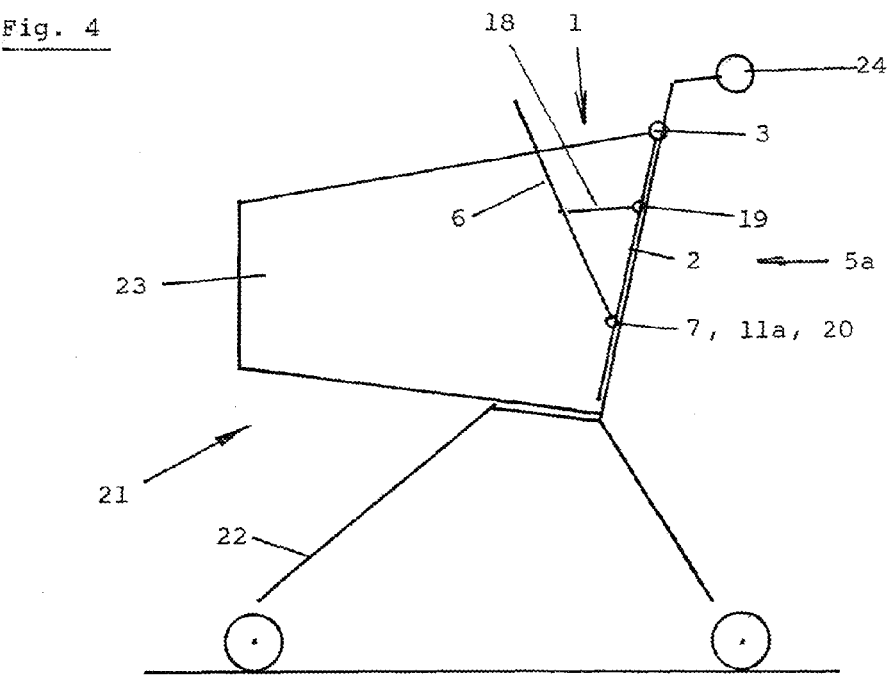
Figure 5:
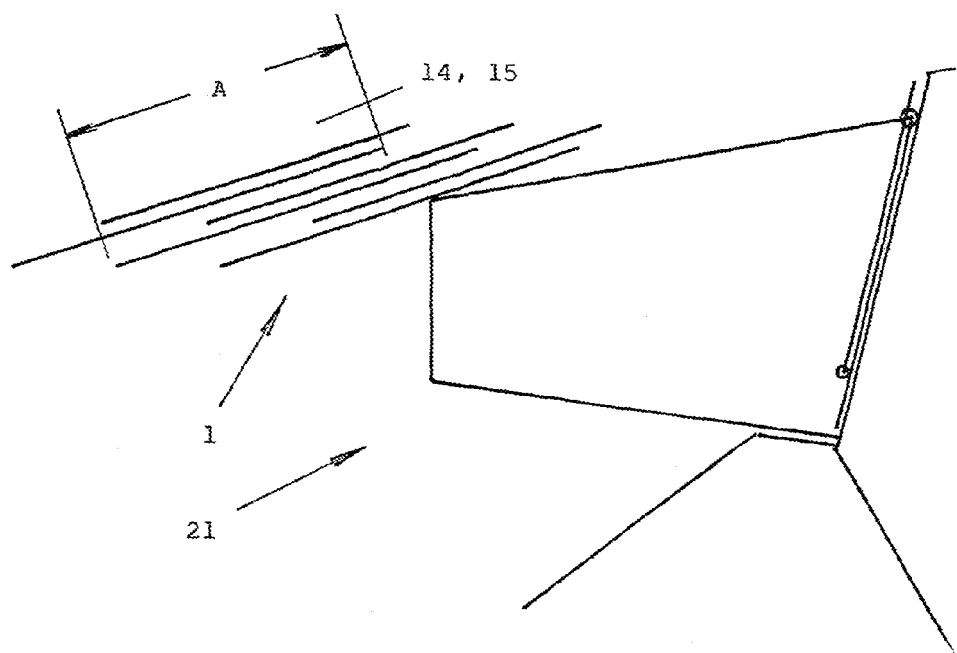
Figure 6:
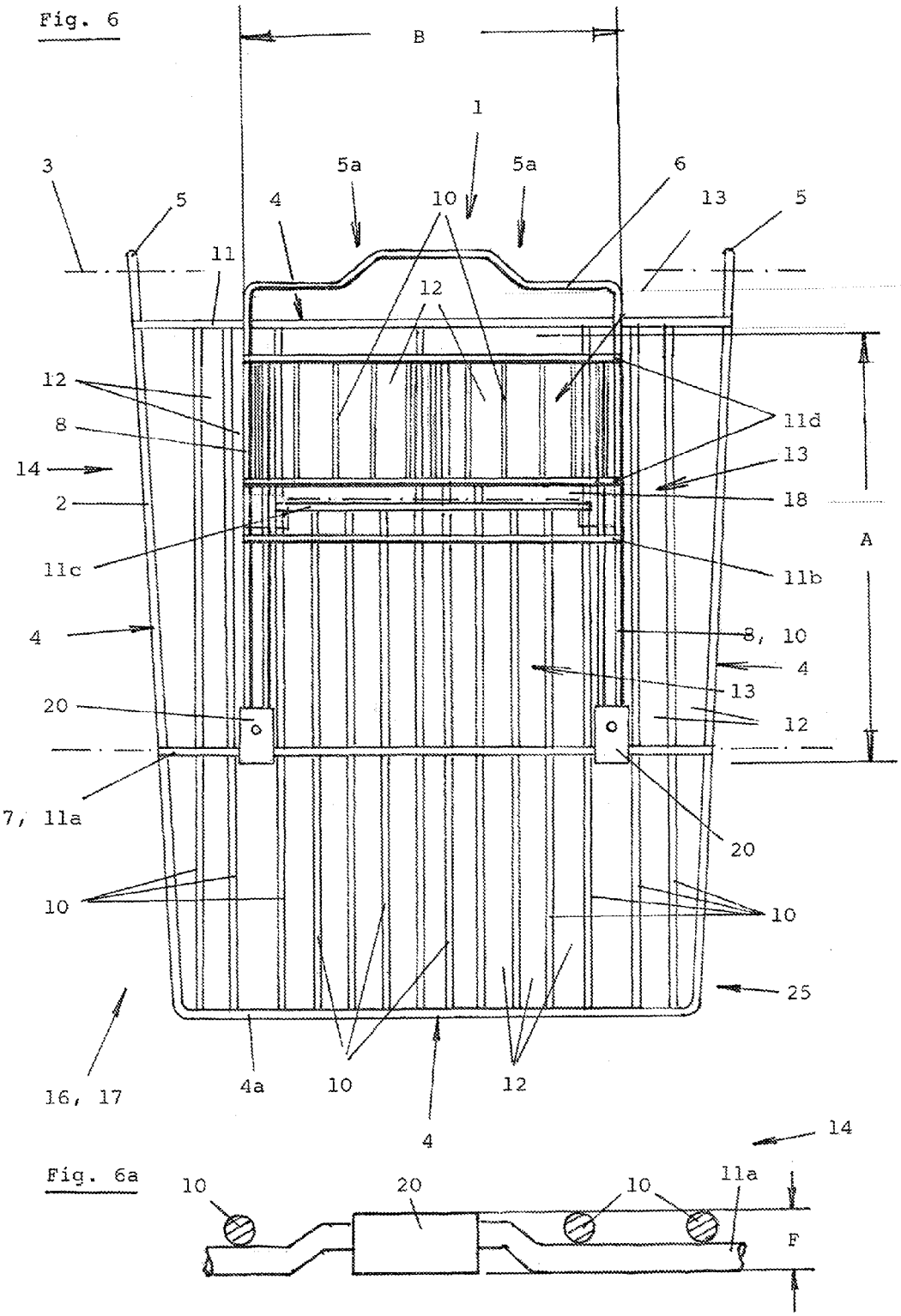
Figure 7:
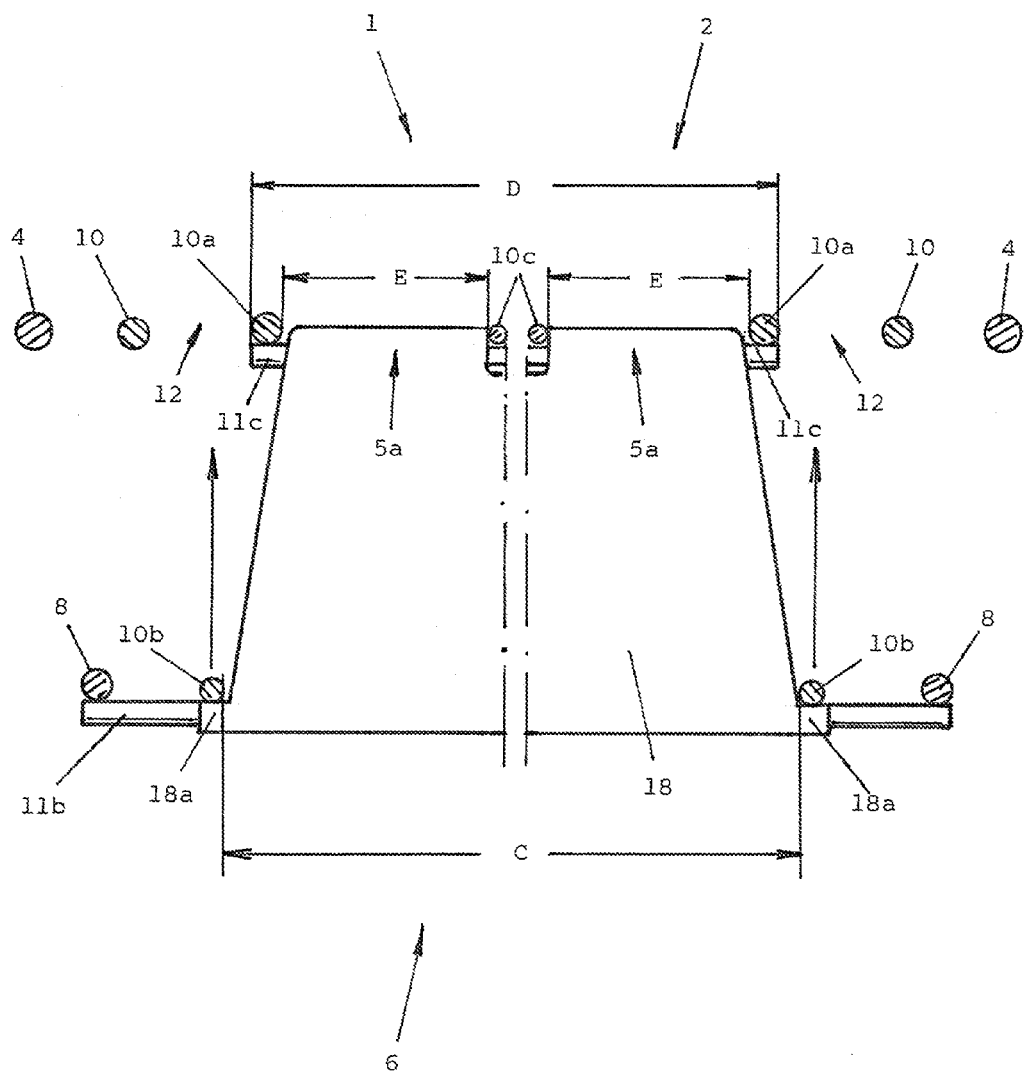

FIGS. 3 *a*) to *d*) show recommended practical applications,

FIG. 4 shows an application, suitable for a shopping cart, in the form of a child seat flap;

FIG. 5 shows the arrangement of individual child seat flaps when these, with their shopping carts, are pushed into one another in a space-saving manner;

FIG. 6 shows a child seat flap as viewed counter to the pushing direction of a shopping cart;

FIG. 6a shows a detail from FIG. 6;

FIG. 7 shows a plan view of the child seat flap shown in FIG. 6, and

Figure 8:
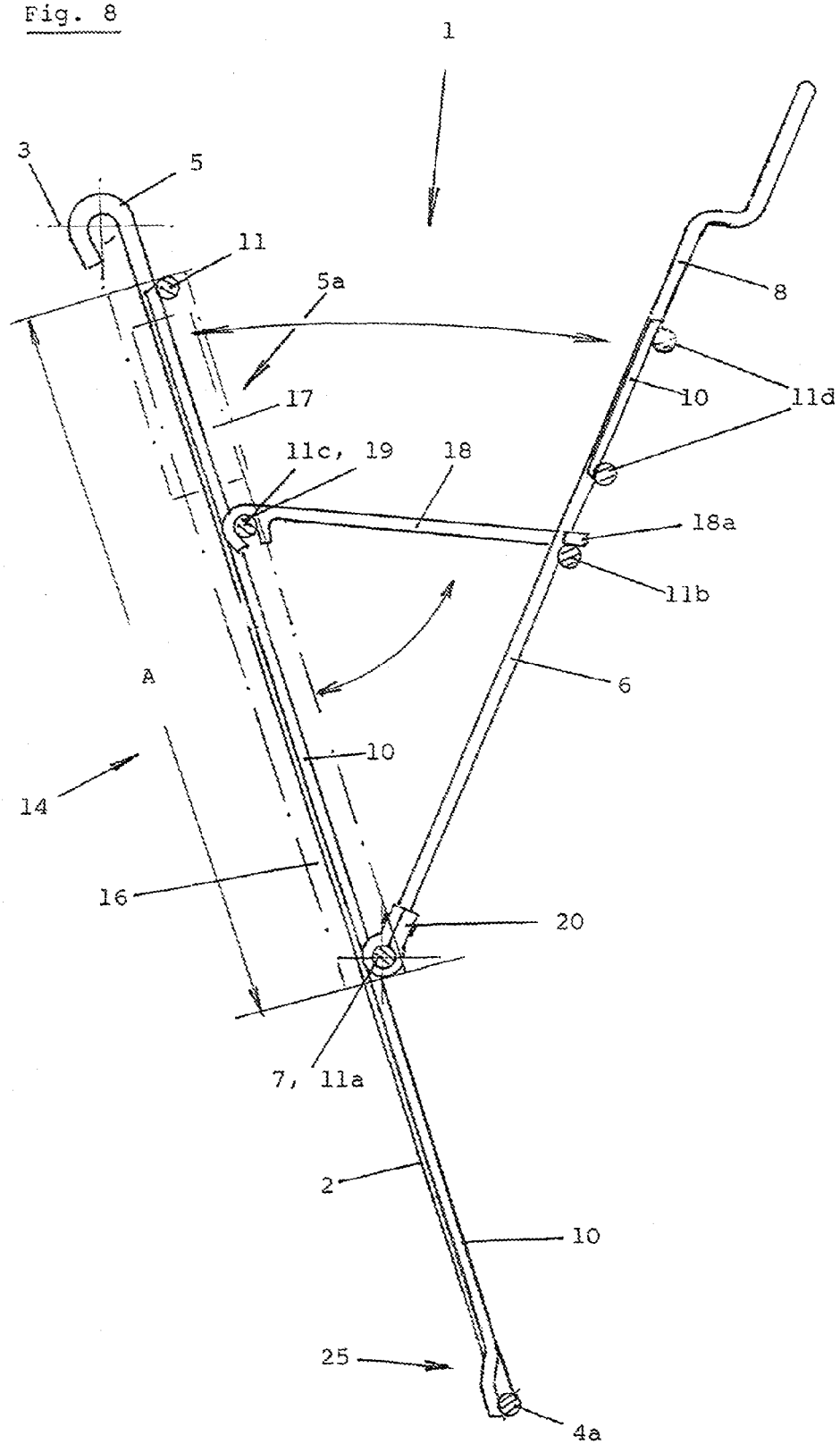

FIG. 8 shows the same child seat flap in a side view and in a folded-up usage position.

Figure 1:
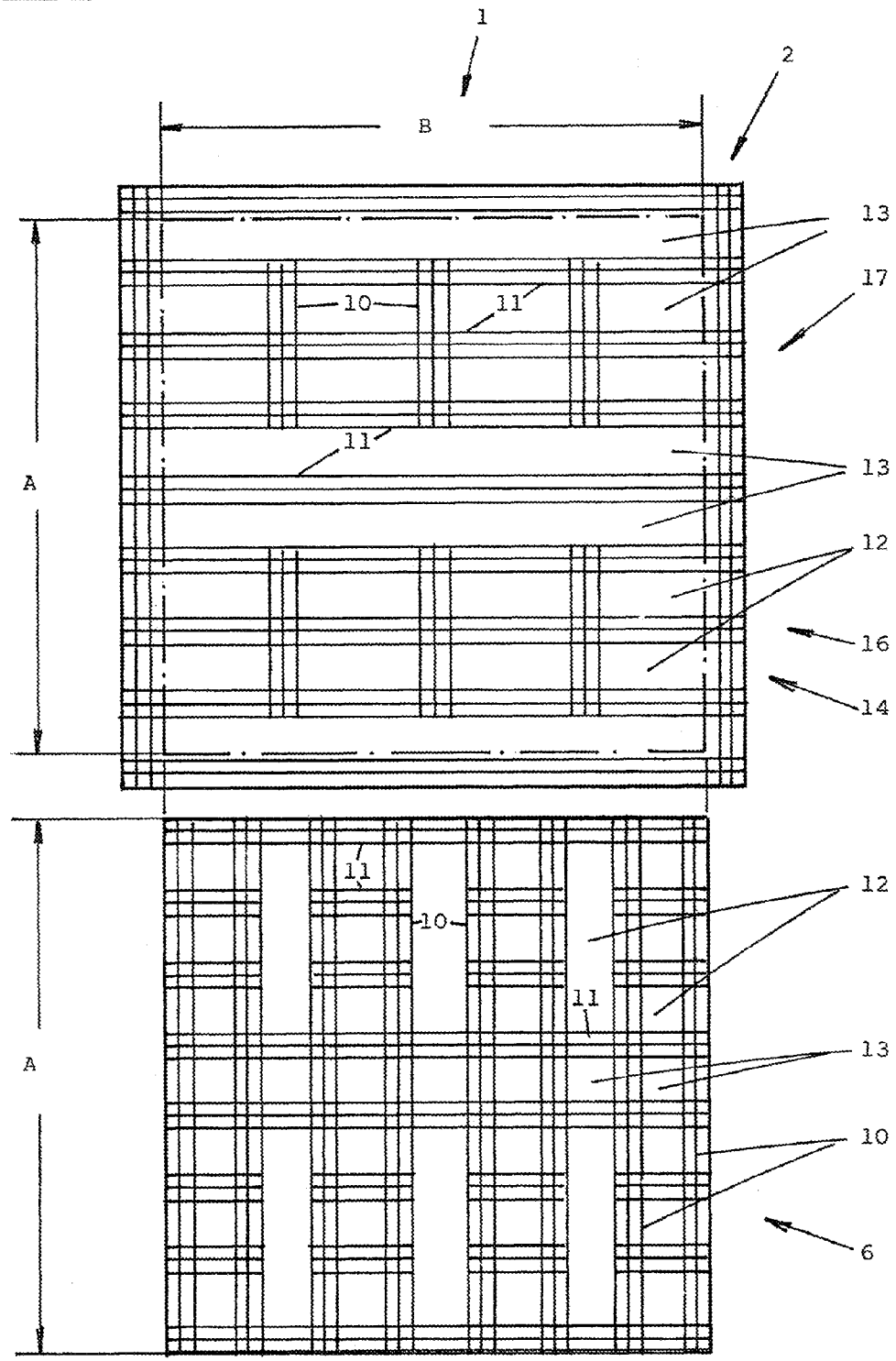
FIG. 1 shows a relatively large and a relatively small wall element.

FIG. 1 shows the basic principle of the invention. The illustration schematically shows two wall elements 2, 6. Details not of relevance to the invention are omitted. The drawing shows, in the example, a relatively large wall element 2 and, below the latter, a relatively small wall element 6. It is for example also possible for two wall elements 2 or 6 of equal size to be used, which have for example an identical rectangular outline and which, in the space-saving arrangement, are arranged in a crisscrossing or overlapping manner. The wall elements 2, 6 have a number of vertically arranged and a number of horizontally arranged reinforcement elements 10, 11. In the example, the reinforcement elements 10, 11 are formed by bars, for example by wires, which are welded to one another in a crisscrossing arrangement and thus form a wire grid structure. It is also the case in the example that the reinforcement elements 10, 11 are arranged in groups of three. Other groupings (groups of two, four, etc.) are possible. It is also possible in each case for individual bars, which then do not form a group, to be arranged correspondingly. To be classified as a reinforcement element 10 and/or 11, the following applies: each reinforcement element 10 is connected in a positionally fixed manner to at least two reinforcement elements 11, and each reinforcement element 11 is connected in a positionally fixed manner to at least two reinforcement elements 10. This also applies to all subsequent exemplary embodiments. In the drawing, in both wall elements 2, 6, the horizontal reinforcement elements 11 are situated in the drawing plane and the vertical reinforcement elements 10 rest on top of the horizontal reinforcement elements 11, wherein, as can be seen from the drawing, the reinforcement elements 10, 11 are of different lengths. Intermediate spaces 13 are formed between the horizontal reinforcement elements 11 arranged in groups. Further intermediate spaces 12 are formed by the vertical reinforcement elements 10 arranged in groups. The intermediate spaces 12, 13 are defined geometrically by the length of the reinforcement elements 10, 11, by the spacing thereof and by the thickness of the reinforcement elements 10, 11. The spatial extent of the intermediate spaces 12, 13 may thus for example be cuboidal, which applies in the case of a rectangular arrangement of the reinforcement elements 10, 11. Viewing the drawing plane from above, the intermediate spaces 13 are, in both wall elements 2, 6, situated lower than the intermediate spaces 12. The intermediate spaces 12, 13 are thus arranged offset relative to one another in terms of height or depth in relation to the abovementioned drawing plane. If one now imaginarily lifts the relatively small wall element 6 upward out of the drawing plane and places it downward into the relatively large wall element centrally from above, such that the space-saving arrangement is assumed, the vertically running reinforcement elements 10 of the relatively small wall element 6 are thus situated entirely or partially in intermediate spaces 12 formed between vertically running reinforcement elements 10 on the relatively large wall element 2, so as to occupy for example a first common space region 17 together with the vertical reinforcement elements 10 of said relatively large wall element. At the same time, in the space-saving arrangement, the horizontally arranged reinforcement elements 11 of the relatively small wall element 6 are situated entirely or partially in intermediate spaces formed between horizontally running reinforcement elements 11 on the relatively large wall element 2, so as to occupy a second common space region 16 together with the horizontal reinforcement elements 11 of said relatively large wall element. The drawing shows that intermediate spaces 12, 13 of different sizes are formed, wherein the size of said intermediate spaces is dependent on the respectively selected grid structure. It can be easily imagined that different grid patterns can be realized within the context of the invention.

The outline of the relatively small wall element 6 is shown by a dash-dotted line in the relatively large wall element 2. The relatively small wall element 6 assumes said position when the relatively large and the relatively small wall element 2, 6 are in the fitted-together state. The two wall elements 2, 6 occupy the common region 14 defined by the dimensions A and B and form an assembly 1, wherein the reinforcement elements 10, 11 are arranged not only within the common region 14 but rather may also project beyond the common region, such that said reinforcement elements are situated only partially in intermediate spaces 12, 13.

For further, more detailed description of the invention, the two space regions 16, 17 mentioned in FIG. 1 are illustrated in FIG. 2. When the wall elements 2, 6 are in the fitted-together state, the horizontal reinforcement elements 11 and the at least one intermediate space 13 are situated in a first space region 16 for example with the thickness b, and the vertical reinforcement elements 10 and the at least one intermediate space 12 are situated in a second space region 17 for example with the thickness a. The intermediate spaces 12, 13 are thus arranged offset with respect to one another as viewed along the thickness thereof, as is also expressed by the dimensions a and b. This also applies for all subsequent exemplary embodiments. It is by all means possible for further components which are not illustrated in any more detail to be situated on at least one of the wall elements 2 and/or 6 within the common region 14, which components, even if they can likewise impart a reinforcing action, primarily have the task of performing different functions than the reinforcement elements 10, 11, and are designed and arranged so as to be situated in at least one of the intermediate spaces 12, 13 when the wall elements 2, 6 are in the space-saving arrangement. Such functional parts may be formed for example by stop parts, shock absorbers, type plates, eyelets, hooks, hook-on parts, connecting elements, bearing parts etc. The same also applies to all exemplary embodiments described and shown below. With the illustration of the two space regions 16 and 17, it is also possible to clearly visualize the difference in relation to assemblies 1 of the prior art, which, by contrast to the present invention, have at least three space regions.

FIG. 3, in the individual illustrations a) to d), shows side-view illustrations of different assemblies 1 of wall elements 2, 6 which are particularly recommended for practical applications. Individual illustration a) shows that the relatively small wall element 6 may be arranged on the relatively large wall element 2 in a movable manner by means of an axle 7.

The arrow shows that the relatively small wall element can be moved into the space-saving arrangement by being pivoted toward the relatively large wall element 2.

Individual illustration b) shows a relatively large wall element 2 which is provided in discrete form and a relatively small wall element 6 which is provided in discrete form. The relatively small wall element 6 can, in the direction of the arrow, be moved into the space-saving arrangement by being moved toward the relatively large wall element 2.

Individual illustration c) shows a relatively large wall element 2 on which two relatively small wall elements 6 are connected to the relatively large wall element 2 by means of in each case one axle 7. The arrows again show that the two relatively small wall elements 6 can be moved into the space-saving arrangement by being pivoted toward the relatively large wall element 2.

Finally, individual illustration d) shows a relatively large wall element 2 and two relatively small wall elements 6, each of which are present in discrete form. The relatively small wall elements 6 can, in the direction of the arrow, be moved into a space-saving arrangement by being moved toward the relatively large wall element 2.

The principle corresponding to individual illustration a) may also be applied to foldable child seat flaps, such as are conventional in the case of known shopping carts and will be described in more detail below.

FIG. 4 thus firstly shows, by way of introduction, a shopping cart 21 of the conventional type with a child seat flap 1 which is situated in a usage position and which forms an assembly 1. The shopping cart 21 can, in a known way, be stacked in rows with identical carts 21. Said shopping cart has an undercarriage 22, a basket 23 and a pushing means 24. The known rearward opening of the basket 23 is closed by the child seat flap 1 which, in a known way, for the purpose of stacking a plurality of shopping carts 21, can be pivoted upward into the interior of the basket about a horizontal axis 3 situated at the top. The child seat flap 1 has, as a relatively large wall element 2, a rear wall 2 which is connected to the basket 23 so as to be pivotable about the horizontal axis 3 and which, in a known manner, has two leg holes 5a for the legs of a small child seated on a seat 18. The child seat flap is equipped with a backrest 6 which forms the relatively small wall element 6 and which is connected so as to be movable about a horizontal axle 7 situated in the lower region of the rear wall 2. The backrest 6 may also be connected to the rear wall 2 by means of two bearings 20 (see FIGS. 6, 6a and 7). The seat 18 is connected likewise in a known manner to the rear wall 2, that is to say to the relatively large wall element 2, and to the backrest 6, the relatively small wall element 6, so as to be movable about a horizontal axle 19 and movable slidingly with the latter. The type of connection just described of the seat 18 to the rear wall 2 and to the backrest 6 permits, in a known manner, two different fastening methods. Both the sliding mobility and also the mobility about a horizontal axle 19 are possible in the case of both construction principles in a kinematically reversible manner.

FIG. 5 shows a schematic illustration of a number of child seat flaps 1 in the position that they assume when a plurality of shopping carts are in the stacked state. For clarity, the illustration shows only the final shopping cart 21 which is to be pushed into a stack of shopping carts 21, which final shopping cart has raised the child seat flap 1 of the shopping cart situated immediately in front, as is the case in turn for all of the other shopping carts 21 situated in front. It can be seen in the drawing that the child seat flaps 1, each of them forming an assembly 1, are folded together in a space-saving manner, and that A denotes the length of a common region 14 of the reinforcement elements 10 and 11 etc. described below. In said space-saving arrangement, therefore, the reinforcement elements 10 and 11 etc. of the individual folded-together child seat flaps 1 form in each case one pack 15 with a certain thickness.

FIG. 6 shows the child seat flap 1 in a view counter to the pushing direction of a shopping cart 21. The child seat flap 1 is illustrated as a wire grid structure with a seat 18 formed as a plastics part. The rear wall 2, the backrest 6 and the seat 18 are connected to one another in the manner already described in FIG. 4. Within the frame 4 of the rear wall 2, with the exception of the two hook-on devices 5, there are provided vertical and horizontal reinforcement elements 10, 10a and 11, 11a, 11b etc., see also FIG. 7. The drawing also shows the horizontal and vertical reinforcement elements 10, 10b and 11, 11a etc. of the backrest 6, which also include the border 8 which, in the broader sense, likewise forms two reinforcement elements 10, see again FIG. 7. At the lower portion 4a of the frame 4 of the rear wall 2, it is possible either for the reinforcement elements 10 to be cranked by the material thickness d of the frame 4, for example so as to run parallel, as shown, or for the lower region of the frame 4 to be cranked in the opposite direction, such that the reinforcement elements 10 can be welded rectilinearly and in a crisscrossing configuration to the lower portion 4a of the frame 4 by spot welding, see also FIG. 8. Said cranks 25 lie outside the common region 14 defined by the dimensions A and B.

The reinforcement elements 10, 10a, 10b, which are in a spaced-apart arrangement, form intermediate spaces 12, and intermediate spaces 13 are formed as a result of the spaced-apart arrangement of the reinforcement elements 11, 11a etc. Here, when the child seat flap 1 is in the folded-together state, that is to say in its space-saving arrangement, the vertical reinforcement elements 10, 10b of the backrest 6 are situated entirely or partially in intermediate spaces 12 situated on the rear wall 2, said intermediate spaces being formed on the rear wall 2 between vertically running reinforcement elements 10, 10a, while it is simultaneously also the case in the space-saving arrangement that the horizontally arranged reinforcement elements 11b and 11d of the backrest 6 are situated entirely or partially in intermediate spaces 13 formed on the rear wall 2 between horizontally running reinforcement elements 11, 11a, 11c, see again FIG. 7. The reinforcement element 11b is provided for supporting the seat 18, while the reinforcement elements 11d together with short reinforcement elements 10 form a rest surface, situated on the backrest 6, for the back of a child. The protrusion of vertical reinforcement elements 10, 10a, 10b into intermediate spaces 12 provided for the purpose and the protrusion of the reinforcement elements 11, lib and 11d into intermediate spaces 13 provided for the purpose is achieved in that the reinforcement elements 10, 11 etc. in question of the rear wall 2 and of the backrest 6 are arranged offset. In the example, the two single-piece or two-piece bearings 20 surround the reinforcement element 11a, which belongs to the rear wall 2, with a small amount of play and are in each case fixedly connected to the two outer reinforcement elements 8, 10 which laterally delimit the backrest 6, see also FIG. 6a. The utilization of the intermediate spaces 12 and 13 is realized in the folded-together, that is to say space-saving state of the child seat flap 1. The child seat flap 1 may also include further reinforcement elements 10, 11 which, for clarity, are not shown here, without these further reinforcement elements being described in any more detail and without departing from the scope of the invention. The reference numerals 10 and 11 supplemented by alphabetic characters serve merely for better differentiation. Ultimately, all of said parts are vertical and horizontal reinforcement parts 10, 11.

In addition to FIG. 6, FIG. 6a shows, in a plan view and in detail, the reinforcement element 11a with one of the two bearings 20. In order that, when the rear wall 2 and the backrest 6 are in the space-saving arrangement, the bearings 20 do not protrude beyond the rear wall 2 and the backrest 6, it is expedient if, at the locations at which the bearings 20 are provided, the reinforcement element 11a is cranked in the direction of the reinforcement elements 10, which are connected to the reinforcement element 11a, to such an extent that the thickness F of the two bearings 20 is no greater than the sum of the thickness of the reinforcement element 11a and the thickness of the thickest reinforcement element 10 which is connected to the reinforcement element 11a. This relationship clearly emerges from the drawing.

FIG. 7 shows, in a reduced sectional illustration and in a plan view, the child seat flap 1 described in FIG. 6 in the folded-open usage position. The backrest 6 is indicated by the border 8. The frame 4 indicatively represents the rear wall 2. The seat 18 is movably mounted on the reinforcement element 11c which belongs to the rear wall 2 and which serves as a horizontal axle. Said seat rests with its opposite side on the reinforcement element 11b which serves as a support, said reinforcement element 11b belonging to the backrest 6 and, in a known manner, engaging with in each case one projection 18a behind in each case one reinforcement element 10b which belongs to the backrest and which is situated closest to the seat 18, such that the seat 18 is secured so as to be prevented from becoming detached. On the two ends of the reinforcement element 11c there is situated in each case one reinforcement element 10a, which reinforcement elements 10a, connected to the reinforcement element 11c, and together with two central reinforcement elements 10c, form the two leg holes 5a which are situated in the rear wall 2 and the width of which is denoted by the dimension E. The clear spacing C between the two reinforcement elements 10b, which are engaged behind by the projections 18a, of the rear wall 6 is greater than the length D of the reinforcement element 11c. If the backrest 6 is moved into the space-saving arrangement in which it assumes the non-usage position, the reinforcement elements 10b which are engaged behind by the projections 18b travel, see arrows, into intermediate spaces 12 which adjoin the ends of the reinforcement element 11c at both sides and which are formed by the reinforcement elements 10, 10a, which are arranged there in pairs, of the rear wall 2. When the child seat flap 1 is in the space-saving arrangement, the two reinforcement elements 10b, which are engaged behind by the projections 18a, of the backrest 6 are then situated in each case in one intermediate space 12 situated on the rear wall 2.

The child seat flap 1 described in FIG. 6 is shown in a side view and in the folded-open state, that is to say in the usage position, in FIG. 8. The rear wall 2 is illustrated in the position in which it is mounted on the shopping cart 21. For this purpose, the rear wall 2, as a relatively large wall element 2, terminates at the top with two hook-on means 5. In the example, the upper edge of the rear wall 2 is formed by a horizontal reinforcement element 11. This is followed further below by a horizontal reinforcement element 11c which forms the horizontal axle 19 for the seat 18. In the lower region of the rear wall 2 there is provided a horizontal reinforcement element 11a which connects the two sides 4 of the rear wall 2 and which forms the horizontal axle 7 for the backrest 6 and for the two bearings 20. Outer and two central vertical reinforcement elements 10a, 10c (see FIG. 7) lead, so as to delimit the leg holes 5a, from the top to the bottom edge 4 of the rear wall 2. Within the region 14, with the exception of the two central reinforcement elements 10c, the other reinforcement elements 10 extend from the bottom upward only as far as the reinforcement element 11c. The leg holes 5a are delimited horizontally by the horizontal reinforcement elements 11 and 11c and vertically by reinforcement elements 10a, 10c. The seat 18 is mounted on the reinforcement element 11c by means of a snap-action connection. The seat 18 furthermore rests with its rear end on the reinforcement element 11b, which is situated on the backrest 6, and engages with its projections 18a behind the reinforcement elements 10b (see FIG. 7). The backrest 6, as a relatively small wall element 6, is conversely supported on the projections 18a, such that in a known way, the backrest 6 can be folded open only as far as a certain end position. Provided on the backrest 6 above the reinforcement element 1ib are two spaced-apart horizontal reinforcement elements 11d which are connected to short vertical reinforcement elements 10. The border 8 of the backrest 6 is angled upward and rearward such that, when the child seat flap 1 is folded together, said portion, which lies outside the common region 14, can circumvent the horizontal reinforcement element 11 which is situated on the rear wall 2. The backrest 6 may by all means also have one or two further reinforcement elements 11 which may impart an additional reinforcing action to the backrest 6. The space regions 16 and 17 are denoted by dash-dotted lines. For better clarity, the space regions 16 and 17 are illustrated as being thicker than they are in reality. The actual thickness of the space regions 16 and 17 and the spatial extent thereof is determined ultimately by the thicknesses of the above-described components 8, 10, 11 etc., 18 and 20 which are situated in the common region 14 and by the protrusion of said parts into one another when the child seat flap 1 is in the folded-together state, wherein here, the seat 18 is situated within intermediate spaces 12 and/or 13. The above-described reinforcement elements 10, 11 etc. manufactured from wire may also be replaced by reinforcement elements 10, 11 etc. composed of areal portions, webs, ribs and the like, such as are known at least from child seat flaps 1 manufactured from plastic.

The invention claimed is:

1. An assembly comprising:
a first and a second wall element, in which the wall elements are either movably connected to one another or are presently separate and can be transposed from a non-space-saving arrangement into a space-saving arrangement, the first wall element including first vertical reinforcement elements connected crosswise with first horizontal reinforcement elements, the second wall element including second vertical reinforcement elements connected crosswise with second horizontal reinforcement elements,
each vertical reinforcement element is crosswise connected with at least two horizontal reinforcement elements and each horizontal reinforcement element is crosswise connected with at least two vertical reinforcement elements,
the first vertical reinforcement elements form at least one first interspace therebetween, the at least one first interspace having a thickness defined by and equal to a thickness of a first cross section of one of the first vertical reinforcement elements, the first cross section being perpendicular to a longitudinal axis of the one of the first vertical reinforcement elements,
the first horizontal reinforcement elements form at least one second interspace therebetween, the at least one second interspace having a thickness defined by and equal to a thickness of a second cross section of one of the first horizontal reinforcement elements, the second cross section being perpendicular to a longitudinal axis of the one of the first horizontal reinforcement elements,
wherein, in the space-saving arrangement and within a common region, each of the second vertical reinforcement elements is at least partially disposed in the at least one first interspace and each of the second horizontal reinforcement elements is at least partially disposed in the at least one second interspace.

2. The assembly according to claim 1, wherein at least one of the second vertical reinforcement elements includes a hinge portion engaging one of the first horizontal reinforcement elements, the linearly extending portion extending from the hinge portion.

3. The assembly according to claim 1, wherein the linear portion spans at least an entire distance between two adjacent first horizontal reinforcement elements.

4. The assembly according to claim 1, wherein the first and second vertical reinforcement elements and the first and second horizontal reinforcement elements have different lengths.

5. The assembly according to claim 1, wherein at least one of the first horizontal reinforcement elements of the first wall element is intended for movable placement of a seat, from two ends of which the first interspace follows, that one of the second horizontal reinforcement elements provided for further support of the seat is disposed on the second wall element and two second vertical reinforcement elements are provided on the second horizontal reinforcement element, intended for lateral delimitation of the seat, and that in the space-saving arrangement, the second vertical reinforcement elements are located in the second interspace that follows the first horizontal reinforcement elements.

6. The assembly according to claim 5, wherein the clear distance between the two vertical reinforcement elements is greater than the length of the horizontal reinforcement element.

7. The assembly according to claim 5, wherein the seat is located within first interspaces and/or second interspaces in the space-saving arrangement of the wall elements.

8. The assembly according to claim 1, wherein at least one of a stop part, a shock absorber, an identification plate, an eye, a hook, a suspension part, a connection part, and a bearing part are provided on at least one of the wall elements and located in at least one of the first and second interspaces in the space-saving arrangement of the wall elements.

* * * * *